INVENTORS
ROBERT S. KERTCHER
HERMAN W. HUTCHCRAFT
OLIVER LA PLANT
BY
ATTORNEYS

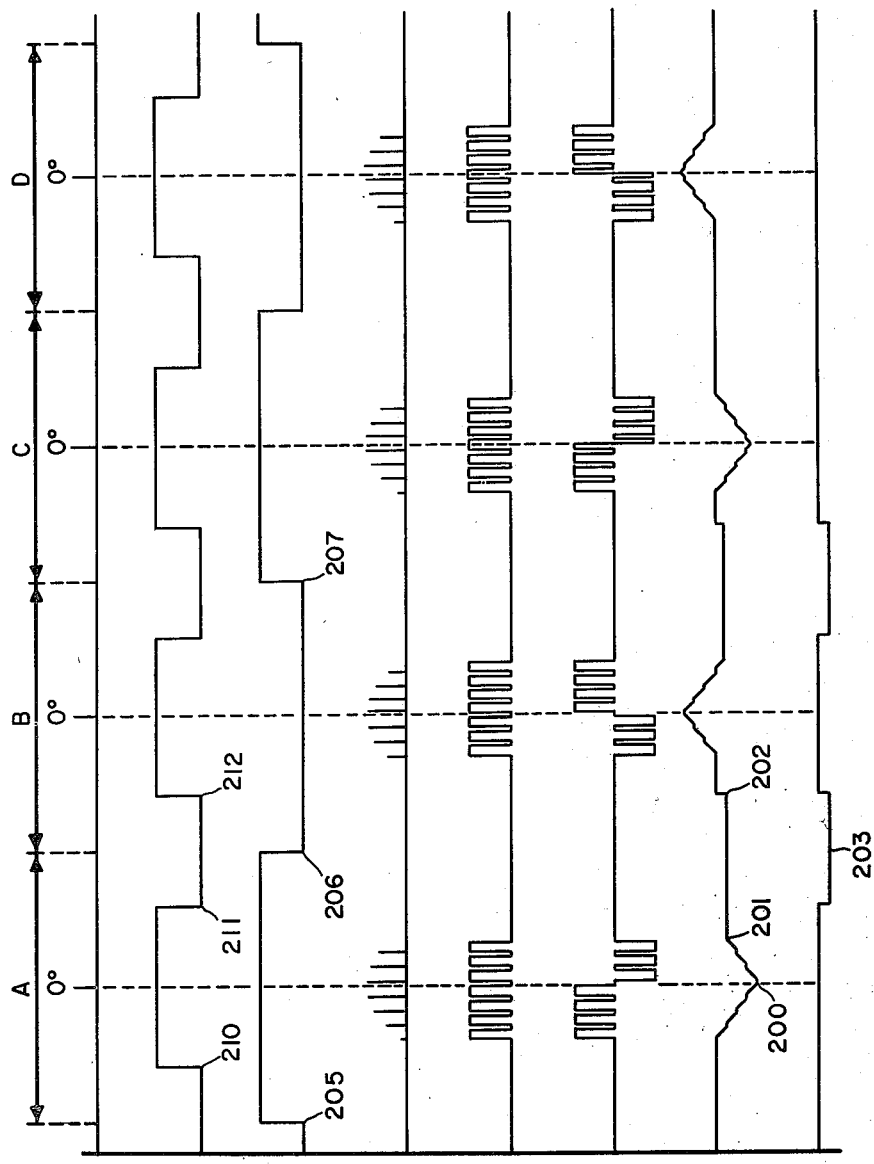

2,839,352
RADAR BEARING ERROR INDICATING SYSTEM

Robert S. Kertcher, Ventura, and Oliver La Plant and Herman W. Hutchcraft, Oxnard, Calif., assignors to the United States of America as represented by the Secretary of the Navy Application November 4, 1955, Serial No. 545,140

9 Claims. (Cl. 343—16)

(Granted under Title 35, U. S. Code (1952), sec. 266)

The invention described herein may be manufactured and used by or for the Government of the United States of America for governmental purposes without the payment of any royalties thereon or therefor.

The present invention relates to a new and novel radar bearing error indicating system and more particularly to a radar bearing error indicating system wherein a visually indicating meter provides an accurate and easily distinguished representation of the bearing error of a target in relation to the cursor in a radar installation.

The invention system is especially adapted for use in simple and relatively inexpensive search type sector scanning units as employed in installations where more complex and inexpensive units are not available. In such radar installations, an operator ordinarily manually tracks the target with the aid of a plurality of hand operated cranks. In such installations, the target is manually centered in range and bearing on the scope of the unit, a horizontal range line and a plurality of vertical bearing lines being provided for centering the target. The major problem in such tracking methods lies in accurately positioning the target shape symmetrically about the center bearing line which represents a cursor. This is a well known problem and is caused by the indistinct target shape on the radar scope, radar fading, a slow and nonuniform scan rate, wide antenna pattern and also the human error involved in attempting to visually bisect a target shape. In order to overcome the aforementioned difficulties, the present invention provides a zero center meter which indicates with high sensitivity the position of the target with respect to the cursor. By merely observing the meter, a radar operator is immediately informed as to whether the target is to the right or the left of the radar cursor and by adjusting the radar unit to the point where the meter reads Zero, the operator can center the target with respect to the radar cursor with a high degree of accuracy thereby increasing the reliability of the unit and considerably reducing operator fatigue which is a serious problem when prior art methods and systems are employed.

An object of the present invention is the provision of a new and novel radar bearing error indicating system wherein the necessity of bisecting a target shape on a radar scope is eliminated when manually tracking a target.

Another object is to provide a radar bearing error indicator system which substantially reduces operator fatigue in manual tracking of a target.

A further object of the invention is the provision of a radar bearing error indicating system which is relatively simple and inexpensive in construction, yet is sensitive and reliable in operation.

Other objects and many of the attendant advantages of this invention will be readily appreciated as the same becomes better understood by reference to the following detailed description when considered in connection with the accompanying drawings wherein:

Fig. 3 illustrates the wave forms appearing at various points in the circuit.

Figure 1:
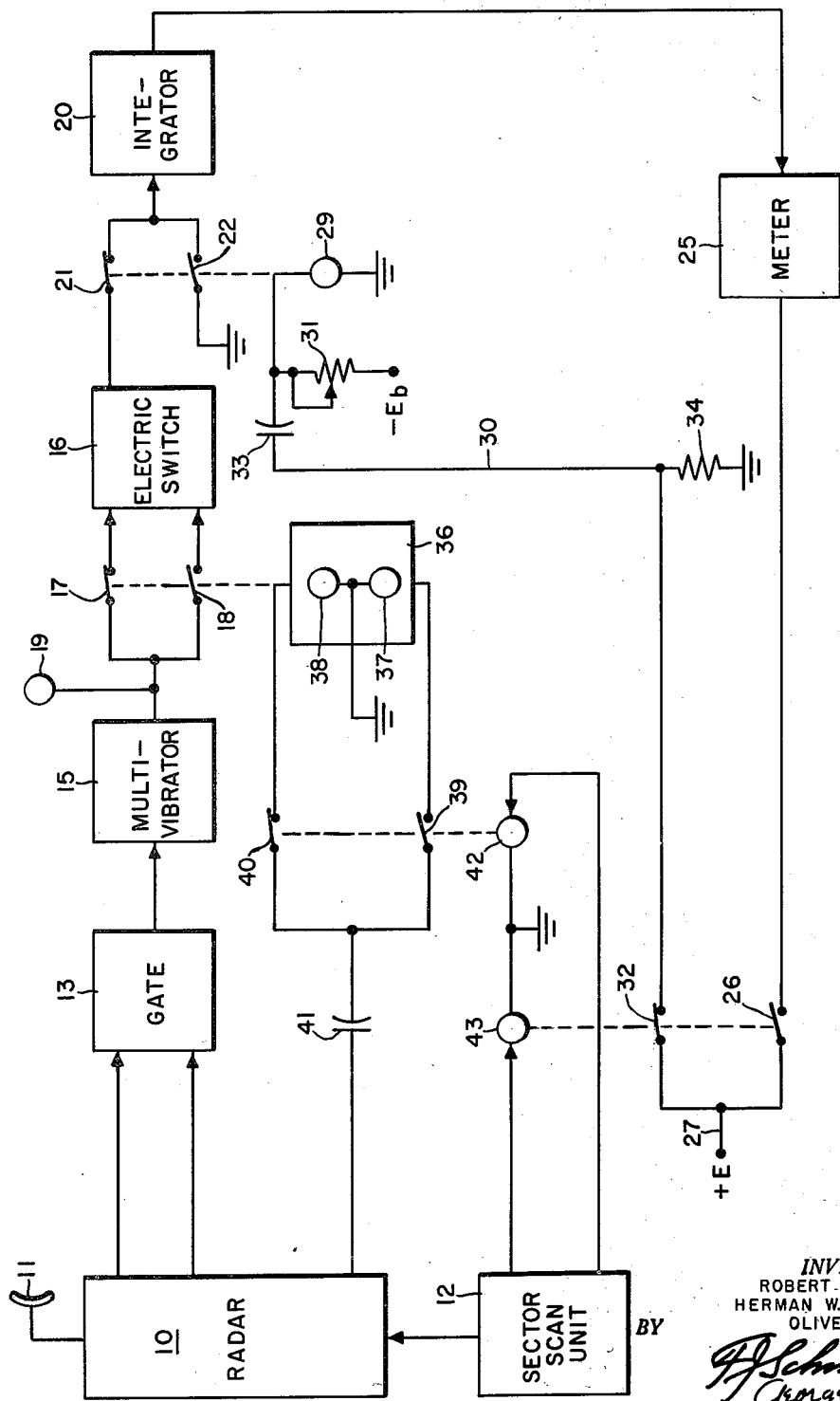
Fig. 1 is a block diagram of the invention system.

Referring now to the drawings wherein like reference characters designate like or corresponding parts throughout the several views, there is shown in Fig. 1 a conventional radar 10 having an antenna 11 and being connected to the sector scan unit 12 which causes the radar antenna to be mechanically driven back and forth through a predetermined angle thereby providing a sector scan, unit 12 also being arranged in a well known manner to provide two control voltages, the purpose of which will be hereinafter described.

The conventional video output voltage and a range gate voltage which may be adjusted to pass signals within a limited range are fed from the radar unit into a gate means 13. The signals representing the target within the desired range limits are passed through the gate and are impressed upon a conventional monostable multivibrator 15, and an electronic switch 16 is connected through two mechanical switches 17 and 18 to the output of the multivibrator. A signal indicator 19 is also connected to the output of the multivibrator, and an integrator 20 is connected to the output of electronic switch 16 through a mechanical switch 21, the integrator being connected to ground through a mechanical switch 22. A conventional zero center ammeter 25 has one side thereof connected to the output of the integrator 20 and the opposite side thereof is connected to a source of positive voltage through switch 26 and lead 27.

Switches 21 and 22 are alternately operated by an integrator control relay 29 which is connected to a negative source of bias voltage through resistor 31 and is also connected to a positive source of voltage through leads 27 and 30, switch 32 and capacitor 33, a discharge resistor 34 being provided for the capacitor as hereinafter more fully explained. Switches 17 and 18 are alternately operated by a polarized cursor relay 36 having two windings 37 and 38 which are connected through mechanical switches 39, and 40 respectively and a coupling capacitor 41 to a source of bearing mark control voltage produced by the radar unit, the purpose of which will be hereinafter more fully explained.

Switches 39 and 40 are alternately operated by a cursor control relay 42 which is connected to a source of latch control voltage produced by the sector scan unit 12. Switches 26 and 32 are alternately operated by an output control relay 43 which is connected to a source of sector gate control voltage produced by the sector scan unit.

Figure 2:
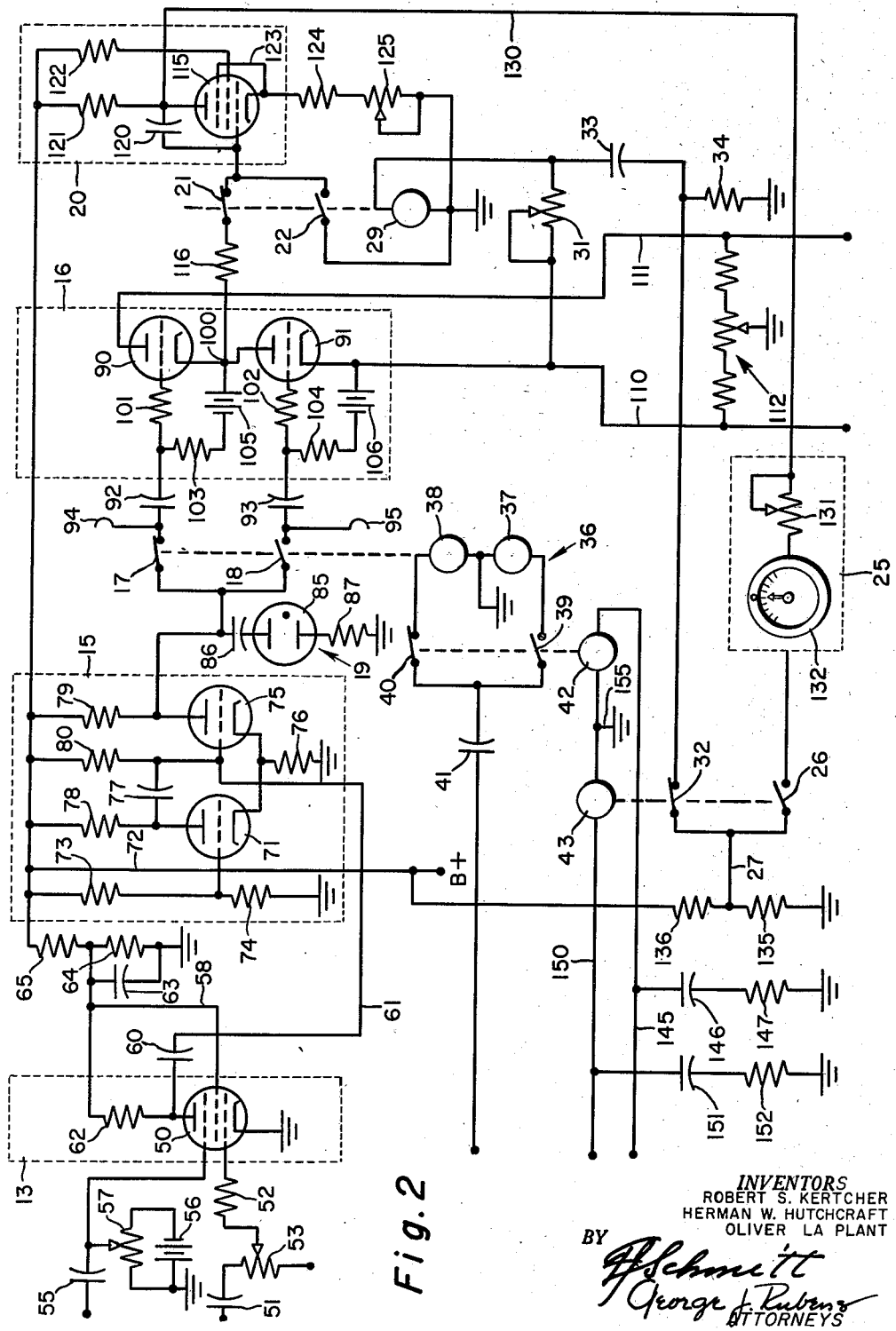
Fig. 2 is a schematic circuit diagram of the system shown in Fig. 1.

Referring now to Fig. 2, it may be seen that gate 13 comprises a pentode 50, the grid of which is connected to the video output of the radar unit through a coupling capacitor 51 and resistors 52 and 53, the latter of which is utilized for adjusting the video sensitivity. The suppressor grid of pentode 50 is connected to the source of range gate voltage through a coupling capacitor 55, and a biasing source such as a battery 56 is connected through the potentiometer 57 to the suppressor grid for adjusting the bias thereon such that tube 50 is normally nonconductive in the absence of a positive range gate voltage. Resistor 62 provides a plate load for tube 50, resistors 64, 65 serving as a voltage divider for the B-plus voltage to tube 50; and a filter capacitor 63 serves to filter out the pulses in the output signal of tube 50 thereby maintaining the B-plus supply voltage of the system relatively constant. The screen grid of tube 50 is connected to one side of the filter by means of lead 58.

The plate of tube 50 is connected through a capacitor 60 and lead 61 to the grid of a triode 75 which comprises one of the tubes of the multivibrator of the system. Triode 71 comprises the second tube of a conventional monostable multivibrator and it is evident that tubes 71 and 75 may be incorporated in a single envelope if desired. A lead 72 is connected to a source of B-plus voltage, the grid of tube 71 being biased to the proper potential by means of resistor 73 connecting the grid to the B-plus source and a resistor 74 connecting the grid to ground. The cathodes of tubes 71 and 75 are connected to one another and are connected to ground through a resistor 76. The plate of tube 71 is connected to the grid of tube 75 through a coupling capacitor 77. Resistors 78 and 79 provide plate loads for tubes 71 and 75 respectively and the grid of tube 75 is connected to the B-plus source through resistor 80.

Signal indicating means 19 comprises a gas filled tube 85 having one side thereof connected to the output of multivibrator 15 through a capacitor 86 and the other side thereof connected to ground through a resistor 87.

The output of the multivibrator is also connected to the grids of triodes 90 and 91 through the intermediary of switches 17, 18 and capacitors 92, 93 respectively. Jacks 94 and 95 are provided at this point in the system in order that the signal at this point may be examined with auxiliary equipment if desired.

Each of the sets of switches operated by the respective relays in the system are alternately operable, or in other words when one of each pair is closed, the other switch of such pair will be open. As shown, switch 17 is closed and switch 18 is open.

The cathode of tube 90 is connected to the plate of tube 91 at a common point 100, and the grids of each of these tubes are connected through similar resistors 101, 102 and resistors 103, 104 respectively to a source of bias voltage such as batteries 105 and 106 respectively. The cathode of tube 91 is connected to a source of negative voltage, and the plate of tube 90 is connected to a source of positive voltage by leads 110 and 111 respectively. A conventional resistor balancing network 112 is provided for balancing the output gain of tubes 90 and 91 in a well known manner.

Integrator 20 is a conventional Miller circuit as described for example in "Electronic Time Measurements," Radiation Laboratory Series, vol. 20, chapter 8, by R. I. Hulsizer, F. C. Williams, McGraw-Hill Book Company, New York 1949, and includes a pentode 115 the grid of which is connected through a limiting resistor 116 and switch 21 to the common point 100 of electric switch 16. The grid of tube 115 is also connected through an integrating capacitor 120 to the plate of the tube which is in turn connected through plate load resistor 121 to the B-plus source. The screen grid of tube 115 is connected through a resistor 122 to the B-plus source, and the suppressor grid of the tube is connected by lead 123 to the cathode of the tube. The cathode of tube 115 is connected through resistor 124 and variable resistor 125 to ground, switch 22 providing a path from the grid of the tube to ground.

The output of the integrating means is connected by means of lead 130 and a variable resistor 131 to one side of a visual indicating means which is shown for example as a zero center ammeter 132, resistor 131 being provided for adjusting the sensitivity of the meter. The opposite side of the meter is connected by means of switch 26 and lead 27 to the source of B-plus voltage through a voltage divider network comprising resistors 135 and 136. Adjustable resistor 31 connects integrator control relay 29 to the source of negative voltage through lead 110 and is utilized to adjust the negative bias on the integrator control relay. It is evident that relay 29 controls the operation of switches 21 and 22, and in the position shown, switch 21 is closed and switch 22 is open.

The latch control voltage is impressed on one side of cursor control relay 42 by means of lead 145 which is connected to ground by a conventional filter comprising capacitor 146 and resistor 147 for filtering out noise in the latch voltage signal. The sector gate voltage is impressed on one side of the output relay 43 by means of lead 150 which is also connected to ground by a conventional filter comprising capacitor 151 and resistor 152 which is designed to filter out noise in the control voltage signal. The opposite sides of relays 42 and 43 respectively are connected to ground through lead 155, and in the position shown switches 32 and 40 are closed, and switches 26 and 39 are open.

The operation of the device is as follows:

To facilitate an understanding of the invention system, it will be helpful to refer to Fig. 3 wherein the wave forms appearing at various points of the system are illustrated. The various voltages are identified at the left of this figure, the abscissas of each of the illustrative wave forms being a time scale, and the ordinates of these voltages represent positive and negative voltages with respect to a reference voltage. The time intervals indicated by letters A and C at the top of the figure represent times during which the radar antenna is scanning from left to right and the time intervals B and D represent times during which the radar antenna is scanning from right to left. It is therefore apparent that the wave forms as illustrated show the voltages in the system during two complete oscillations of the radar antenna, and for purposes of illustration the target is considered to be to the left of the reference cursor during the times A and B and symmetrically positioned with respect to the reference cursor during the times C and D.

Ungated video is impressed on the grid of gate tube 50, and a positive selector pulse, which is a radar sweep generator range gate selected by the operator, is impressed on the suppressor grid of the gate. The gated video which is shown as gated video in Fig. 3 is impressed on multivibrator 15. It is apparent that the video signal for a single target is made up of a series of short time duration pulses with varying amplitude, the number of pulses for a given target depending upon the rate at which the antenna scans the target, antenna pattern, pulse repetition, rate of the radar and width of the target. Each video pulse triggers one complete cycle of the multivibrator 15, the timing circuit of the multivibrator being adjusted to provide an output of uniform high amplitude square pulses the wave form of which is designated multivibrator output in Fig. 3.

As shown in Fig. 2, switch 40 is in closed position and switch 17 is closed due to the position of cursor relay 36. At the time zero degrees is indicated during time interval A in Fig. 3, a pulse as indicated in the bearing mark wave forms is impressed on winding 38 of the cursor relay thereby opening switch 17 and closing switch 18. This bearing mark pulse is produced in a well known manner such that it occurs at the exact center of the radar scan and provides a reference cursor about which the target should be centered. It is therefore apparent that the multivibrator output in the initial portion of the interval A will be impressed through switch 17 upon the grid of tube 90; and in the latter portion of time interval A after the bearing mark pulse has been impressed on the cursor relay, the output of the multivibrator will be impressed through switch 18 upon the grid of tube 91. The positive output signal from the multivibrator will produce a positive signal in the output of electronic switch 16 when switch 17 is closed, and the positive output signal of the multivibrator will produce a negative output signal in the output of the electronic switch when switch 18 is closed.

Accordingly, when the radar antenna is scanning from left to right, the initial portion of the scan will result in a positive output signal from the electronic switch and the latter portion of the scan will produce a negative output signal from the electronic switch. This output signal is illustrated in the wave form designated as electronic switch output in Fig. 3.

The output of the electronic switch is impressed upon the grid of integrator tube 115 and it is apparent that a positive output signal from switch 16 will produce a negative output signal from tube 115 and a negative output signal from switch 16 will produce a positive output signal from tube 115. During time interval A, the target is assumed to the left of the cursor and accordingly the greater portion of the output signal of the multivibrator is to the left of the reference cursor which in turn produces a positive signal output from switch 16 of greater time duration than the negative output signal therefrom.

The positive output signal of switch 16 causes tube 115 to integrate in a negative direction to a point 200 shown in the integrator output wave form of Fig. 3, and the negative portion of the output of switch 16 will cause tube 115 to integrate in a positive direction to a point 201. The voltage appearing at the output of tube 115 during the time interval from point 201 to point 202 represents an error voltage in a negative direction which is impressed on meter 132, resulting in a negative signal on the meter as represented by wave form 203 which is so impressed upon the meter as to produce a reading to the left of zero in a well known manner thereby indicating that the target is to the left of the reference cursor.

At a point 205 along the time scale of the latch voltage which coincides with the beginning of time period A, a positive latch voltage is impressed upon cursor control relay 42 which causes switch 40 to be closed and switch 39 to be open, the latch voltage remaining at a positive value until a point 206 which coincides with the end of time period A whereupon the latch voltage drops to zero and relay 42 is actuated such that switch 39 is closed and switch 40 is opened. In this manner, winding 37 is connected through switch 39 to the source of bearing mark voltage such that when a bearing mark pulse is applied during time interval B, winding 37 will be energized thereby opening switch 18 and closing switch 17. At a point 207 along the latch voltage time scale which coincides with the end of time interval B, the latch voltage again rises to a positive value energizing relay 42 such that switch 40 is again closed and switch 39 is opened whereby the bearing mark pulse during time interval C will energize winding 38 closing switch 18 and opening switch 17.

In this manner, switch 17 is closed during the first half of time intervals A and C, and switch 18 is closed during the second half of time intervals A and C; and switch 18 is closed during the first half of time intervals B and D and switch 17 is closed during the second half of time intervals B and D. This sequence of switching is necessary since the radar antenna scans from left to right during time intervals A and C and from right to left during time intervals B and D whereby target signals to the left of the cursor always appear as positive voltages in the output of switch 16 and target signals to the right of the cursor always appear as negative signals in the output switch 16.

It is therefore apparent that when the antenna is scanning from right to left during time interval B, the initial target signals produce a positive output from the integrator, and the signals representing that portion of the target to the left of the cursor produce a negative output from the integrator resulting in an overall negative error voltage identical with that during time interval A. It may therefore be seen that although the sequence of integration in time intervals A and B is reversed, the net result is the same, indicating that the target is to the left of the reference cursor.

Referring again to Fig. 3, it may be seen that a positive sector gate control voltage is applied to output control relay 43 for a predetermined time interval during each scan of the radar antenna. This positive sector gate voltage has a time interval which is always selected to be larger than that of the anticipated target and yet is of shorter time duration than that of the positive latch voltage. For example, in a radar having a scan of plus 7 degrees to minus 7 degrees with respect to the cursor, the sector gate positive voltage may be applied from approximately plus 4½ degrees to minus 4½ degrees with respect to the cursor. At point 210 along the sector gate voltage time scale, the sector gate voltage energizes output control relay 43, closing switch 32 and opening switch 26 whereupon the B-plus voltage is applied through lead 27 and switch 32 to capacitor 33. Integrating control relay 29 has a negative bias thereon which is adjusted by means of variable resistor 31 to normally close switch 21 and open switch 22. Upon closing of switch 32 by output control relay 43, a positive pulse is instantaneously applied to integrating control relay 29 whereupon capacitor 33 commences to charge up and the voltage on relay 29 drops rapidly to its normal bias potential. The charge will then continue to build up on capacitor 33 and leak off to ground through resistor 31 such that no additional positive voltage is applied to relay 29.

In this manner, relay 29 is caused to instantaneously close when the sector gate voltage is applied at point 210 thereby opening switch 21 and closing switch 22 which grounds the grid of integrator tube 115 and causes the charge thereon to go to zero reference voltage. Relay 29 snaps closed instantaneously and then reopens such that switch 21 is again closed and switch 22 opened. The integrating tube is then in quiescent condition at a positive reference potential and the meter reads zero, which condition may be adjusted by means of variable resistor 125 prior to operation of the device.

Simultaneously with the closing of switch 32 upon application of the sector gate control voltage to relay 43, swich 26 is opened thereby opening the circuit through the meter. It is therefore apparent that the meter will not give a reading during the time that the sector gate voltage is positive and accordingly the meter does not give a reading during the integrating process on integrator 20. When the sector gate voltage again drops to zero at a point 211 in Fig. 3, switch 32 is opened and switch 26 is closed thereby closing the circuit through the meter and providing a meter reading of any error voltage present. The meter reading will continue until the sector gate voltage again rises to positive value at point 212 in Fig. 3 whereupon the meter circuit is again opened and integrator 115 is momentarily grounded.

The aforementioned sequence of operations and their relationship to one another are most clearly understood by reference to the wave forms illustrated in Fig. 3 wherein the target is assumed to be to the left of the cursor during time intervals A and B providing a target error voltage; and the target is assumed to be symmetrical about the cursor during time intervals C and D providing no error voltage. It is apparent that if the target is to the right of the cursor that the wave forms therefor will be similar to those during time intervals A and B but reversed with respect to the cursor and the zero reference voltage, providing a positive error voltage resulting in a reading to the right of zero on the meter.

It should also be noted that the magnitude of the error voltage appearing in the output of integrator 20, and accordingly the magnitude of the deflection and reading of meter 132 is proportional to the actual bearing error. The polarity and magnitude of the output voltage of integrating means 20 therefore accurately represents the direction and amount of bearing error which when impressed on meter 132 provides an operator with an accurate and easily read visible indication thereof. Consequently, the radar operator may track a desired target with high precision by maintaining the needle of meter 132 as nearly as possible at a zero reading. This method of tracking is far more accurate than that obtainable utilizing prior art equipment and substantially reduces operator fatigue.

When there is no target signal at all impressed on the system, the meter will naturally read zero, and in order to obviate the possibility that an operator may believe that he is directly centered on the target when he has no target at all, gas tube 85 is provided which is suitably mounted adjacent meter 132. Tube 85, which may be for example a small neon bulb, will continuously blink on and off as long as a target signal is impressed on the system, but if the target is lost, tube 85 will cease to operate which action will be immediately noticeable to the radar operator whereupon he may refer back to the scope of the radar to again pick up the target for tracking.

Whereas the voltage output of the integrator 20 has been shown as utilized in conjunction with a visual indicating meter, it is apparent that the integrator output voltage may also be impressed upon a conventional automatic tracking system whereby the radar antenna will automatically track the target without the necessity of manual operation by the operator.

It is apparent from the foregoing that there is provided a new and novel radar bearing error indicating system which eliminates the necessity of bisecting an indistinct target shape on a radar scope and which materially reduces operator fatigue. The device is relatively simple and inexpensive in construction, yet is sensitive and reliable in operation.

Obviously many modifications and variations of the present invention are possible in the light of the above teachings. It is therefore to be understood that within the scope of the appended claims the invention may be practiced otherwise than as specifically described.

We claim:

1. A radar bearing error indicating system for use in conjunction with a sector scanning radar which comprises gate means, means for impressing a video output voltage and a range gate voltage on said gate means, multivibrator means connected to the output of said gate means, electronic switch means, a first plurality of switches each of which has one side thereof connected to the output of said multivibrator means and the other side thereof connected to said electronic switch means, means for operating said first plurality of switches, integrating means, a second plurality of switches each of which has one side thereof connected to said integrating means, one of said second plurality of switches having the other side thereof connected to the output of said electronic switch means, another of said second plurality of switches having the other side thereof connected to ground, and means for operating said second plurality of switches whereby the output voltage of said integrating means is of such polarity and magnitude as to accurately represent the direction and amount of bearing error in a sector scanning radar.

2. A system as defined in claim 1 including a first visual indicating means connected to the output of said integrating means.

3. A system as defined in claim 2 including an integrator control relay for operating said second plurality of switches, a third plurality of switches each of which has one side thereof connected to a source of positive voltage, one of said switches having the other side thereof connected to said first indicating means and another of said switches having the other side connected to said integrator control relay.

4. A system as defined in claim 1 wherein said means for operating said first plurality of switches includes a polarized cursor relay having two windings, a fourth plurality of switches each of which has one side thereof connected to a source of bearing mark voltage, one of said fourth plurality of switches having the other side thereof connected to one of said windings and another of said fourth plurality of switches having the other side thereof connected to the other of said windings.

5. A radar bearing error indicating system for use in conjunction with a sector scanning radar which comprises gate means, means for impressing a video output voltage and a range gate voltage on said gate means, multivibrator means connected to the output of said gate means, electronic switch means, a first plurality of switches each of which has one side thereof connected to the output of said multivibrator means and the other side thereof connected to said electronic switch means, a polarized cursor relay for operating said first plurality of switches and having two windings, integrating means, a second plurality of switches each of which has one side thereof connected to said integrating means, one of said second plurality of switches having the other side thereof connected to the output of said electronic switch means, another of said second plurality of switches having the other side thereof connected to ground, an integrator control relay for operating said second plurality of switches, first visual indicating means connected to the output of said integrating means, a third plurality of switches each of which has one side thereof connected to a source of positive voltage, one of said third plurality of switches having the other side thereof connected to said first indicating means, another of said third plurality of switches having the other side thereof connected to said integrator control relay, an output control relay for operating said third plurality of switches each of which has one side thereof connected to a source of bearing mark voltage, one of said fourth plurality of switches having the other side thereof connected to one of said windings, the other of said fourth plurality of switches having the other side thereof connected to the other of said windings, a cursor control relay for operating said fourth plurality of switches, means for impressing a sector gate control voltage on said output control relay and means for impressing a latch control voltage on said cursor control relay.

6. A system as defined in claim 5 including a second indicating means connected to the output of said multivibrator means for indicating the presence of a target signal in the system.

7. A device as defined in claim 5 including means for impressing a negative bias on said integrator control relay such that the integrator control relay is normally biased to a position wherein said one of said second plurality of switches is closed and said other of said second plurality of switches is open, and a capacitor inserted in the connection between the other of said third plurality of switches and said integrator control relay, resistor means for discharging said capacitor when no external voltage is impressed thereon whereby upon closing of the other of said third plurality of switches a positive pulse is applied to said integrator control relay which causes the relay to be momentarily actuated and then returned to its normally biased position.

8. A system as defined in claim 7 wherein said electronic switch comprises two vacuum tubes each having a cathode, grid and an anode, the anode of one tube being connected to the cathode of the other tube at a common point, the output of said electronic switch being taken from said common point, and means for balancing the output gain of the tubes of said electronic switch.

9. A system as defined in claim 8 including adjustable means for obtaining a zero reading on said first visual indicating means when said integrating means is connected to ground.

No references cited.